(12) United States Patent
Torzo et al.

(10) Patent No.: US 9,702,253 B2
(45) Date of Patent: Jul. 11, 2017

(54) LOW PRESSURE TURBINE PROVIDED WITH SPLITTERS AT THE LAST STATOR ARRAY, IN PARTICULAR FOR A GAS TURBINE ENGINE

(71) Applicant: GE AVIO S.r.l., Rivalta di Torino (IT)

(72) Inventors: Davide Torzo, Turin (IT); Ennio Spano, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 491 days.

(21) Appl. No.: 14/279,753

(22) Filed: May 16, 2014

(65) Prior Publication Data
US 2014/0341713 A1    Nov. 20, 2014

(30) Foreign Application Priority Data

May 17, 2013    (IT) .............. TO2013A0400

(51) Int. Cl.
*F01D 1/04* (2006.01)
*F02C 7/24* (2006.01)
(Continued)

(52) U.S. Cl.
CPC ............. *F01D 1/04* (2013.01); *F01D 9/02* (2013.01); *F01D 9/04* (2013.01); *F01D 25/24* (2013.01);
(Continued)

(58) Field of Classification Search
CPC ... F01D 1/04; F01D 9/02; F01D 25/24; F01D 9/04; F02K 1/827; F02C 7/24; Y10T 29/49245; F05D 2230/60; F05D 2260/961; F05D 2260/96; F05D 2220/3215

USPC .................. 415/119, 183; 181/222
See application file for complete search history.

(56) References Cited

U.S. PATENT DOCUMENTS 3,477,231 A    11/1969  Paulson
3,666,043 A *  5/1972  Eschenburg ............ F02C 7/045
                                                                181/214
(Continued)

FOREIGN PATENT DOCUMENTS

EP    0837247 A2    4/1998
WO    2005100753 A1    10/2005

OTHER PUBLICATIONS

Italian Search Report dated Mar. 18, 2013 in application No. ITTO20130400.
(Continued)

*Primary Examiner* — Hoang Nguyen
(74) *Attorney, Agent, or Firm* — Maschoff Brennan

(57) ABSTRACT

A low pressure turbine, in particular for a gas turbine engine, extends along an axis, has an annular conduit for guiding a gas flow and is provided with a plurality of stator arrays of blades and a plurality of rotor arrays of blades; the last of the stator arrays, considering the advancement direction of the gas flow, has a plurality of blades, which define a plurality of spaces between them in circumferential direction; the spaces are split by respective splitters into a radially outer conduit and into a radially inner conduit; the radial position of the splitters is in the neighborhood of a radial reference position such that at least one acoustic mode is of the cut-on type in the radially inner conduit.

4 Claims, 2 Drawing Sheets

(51) Int. Cl.
*F02K 1/82* (2006.01)
*F01D 9/04* (2006.01)
*F01D 9/02* (2006.01)
*F01D 25/24* (2006.01)

(52) U.S. Cl.
CPC ................ *F02C 7/24* (2013.01); *F02K 1/827* (2013.01); *F05D 2220/3215* (2013.01); *F05D 2230/60* (2013.01); *F05D 2260/96* (2013.01); *F05D 2260/961* (2013.01); *Y10T 29/49245* (2015.01)

(56) References Cited

U.S. PATENT DOCUMENTS

| | | | |
|---|---|---|---|
| 3,802,187 A | 4/1974 | Titus | |
| 3,820,628 A | 6/1974 | Hanson | |
| 3,886,737 A * | 6/1975 | Grieb | F02K 3/077 181/220 |
| 4,156,344 A * | 5/1979 | Cuthbertson | F02C 7/045 415/119 |
| 4,373,328 A * | 2/1983 | Jones | F02K 1/72 239/265.27 |
| 4,446,696 A * | 5/1984 | Sargisson | F02C 6/206 60/226.3 |
| 6,561,760 B2 * | 5/2003 | Wadia | F01D 25/02 415/145 |

OTHER PUBLICATIONS

Italian Search Report dated Mar. 18, 2014 in application No. ITTO20130400.

\* cited by examiner

LOW PRESSURE TURBINE PROVIDED WITH SPLITTERS AT THE LAST STATOR ARRAY, IN PARTICULAR FOR A GAS TURBINE ENGINE

The present invention relates to a low pressure turbine provided with splitters at the last stator array, in particular for a gas turbine engine.

BACKGROUND OF THE INVENTION

In the low pressure turbine of a gas turbine, in particular for an engine for aeronautic applications, acoustic emissions are generally reduced by appropriately selecting the number of aerodynamic profiles, i.e. the airfoil count.

The airfoil count is chosen so as to obtain sound waves of gradually reduced amplitude as they propagate inside the turbine, by virtue of the acoustic interactions between rotor arrays and stator arrays, thus obtaining relatively modest acoustic levels at the aeronautic engine exhaust.

This noise control solution has the disadvantage of imposing the number of airfoils and thus of limiting freedom of action in design with regards to aerodynamic optimization.

A different strategy for reducing acoustic emissions consists in adding noise attenuation devices of the passive or active type, within the aeronautic engine. In particular, the passive type devices are defined by soundproofing panels comprising resonators which are appropriately designed to reduce the amplitude of the acoustic emissions. In the known solutions, such panels are applied to the surfaces of the exhaust cone of the gas turbine, downstream of the low pressure turbine, typically at the inner ring of the exhaust cone.

Such a solution has the drawback of having a rather low noise deadening efficacy because of the small available space for arranging the soundproofing panels.

The need is thus felt for a different solution which allows to improve the noise deadening at the low pressure turbine outlet.

Document U.S. Pat. No. 3,802,187A, which corresponds to the preamble of claim 1, suggests to add a splitter in each space between the blades of the last stator array, so as to split in radial manner such a space into an inner conduit and an outer conduit. This document, however, provides no indication on acoustic emissions nor on a possible reduction thereof.

SUMMARY OF THE INVENTION

It is the object of the present invention to make a low pressure turbine provided with splitters at the last stator array, in particular for a gas turbine engine, which allows to solve the need above in simple and cost-effective manner.

BRIEF DESCRIPTION OF THE DRAWINGS

The invention will now be described with reference to the appended drawings which illustrate a non-limitative embodiment thereof, in which.

DETAILED DESCRIPTION OF THE INVENTION

Figure 1:
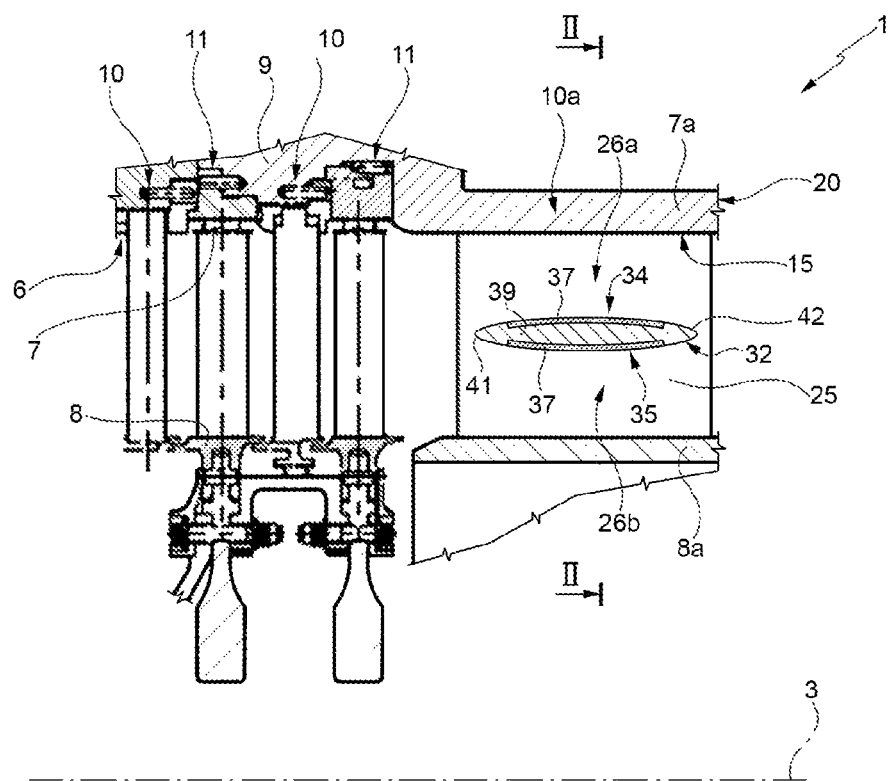
FIG. 1 is a diagrammatic, partial meridian section of a preferred embodiment of a low pressure turbine for a gas turbine engine according to the present invention.

With reference to FIG. 1, reference numeral 1 indicates as a whole, a low pressure turbine (shown partially and by way of example only) belonging to a gas turbine engine, in particular an aeronautic engine.

The turbine 1 has an axial symmetry with respect to an axis 3 coinciding with the engine axis and defines an annular conduit 6 for a gas flow. The annular conduit 6 is radially delimited, outwards, by platforms 7 and, inwards, by platforms 8, having the function of guiding the gas flow, and typically diverging as a function of the gradual expansion of the gases.

The turbine 1 comprises a casing 9, which houses a plurality of stator arrays of blades 10 and a plurality of rotor arrays of blades 11. The rotor arrays 11 are axially alternated with the stator arrays 10 and are fixed to a drive shaft (not shown) which extends along axis 3.

The last stator arrays, considering the advancement direction of the gas flow, is indicated by reference numeral 10a and is arranged in a rear section 15 of the annular conduit 6, upstream of an exhaust cone (not shown). The rear section 15 is radially delimited, outwards, by a platform 7a and, inwards, by a platform 8a, which constitute part of a fixed rear structure 20 of the turbine 1.

The blades of the stator array 10a are indicated by reference numeral 25 and extend from platform 8a to platform 7a.

According to a first embodiment, the blades 25 substantially perform a structural supporting function, and are therefore substantially defined by radial spokes having a preferably elongated shape in direction parallel to axis 3. In this case, the platform 8a is connected (in manner not shown) to a bearing which supports the drive shaft, and the structure 20 defines the member commonly indicated as rear frame of the turbine.

According to a second embodiment (not shown), the blades 25 mainly perform an aerodynamic function, i.e. are shaped so as mainly to satisfy aerodynamic efficiency requirements for guiding the gas flow. In this case, in general, the platform 8a does not perform any supporting function, but is connected to the platform 7a by means of the blades 25, which are commonly known as "outlet guide vanes".

Figure 2:
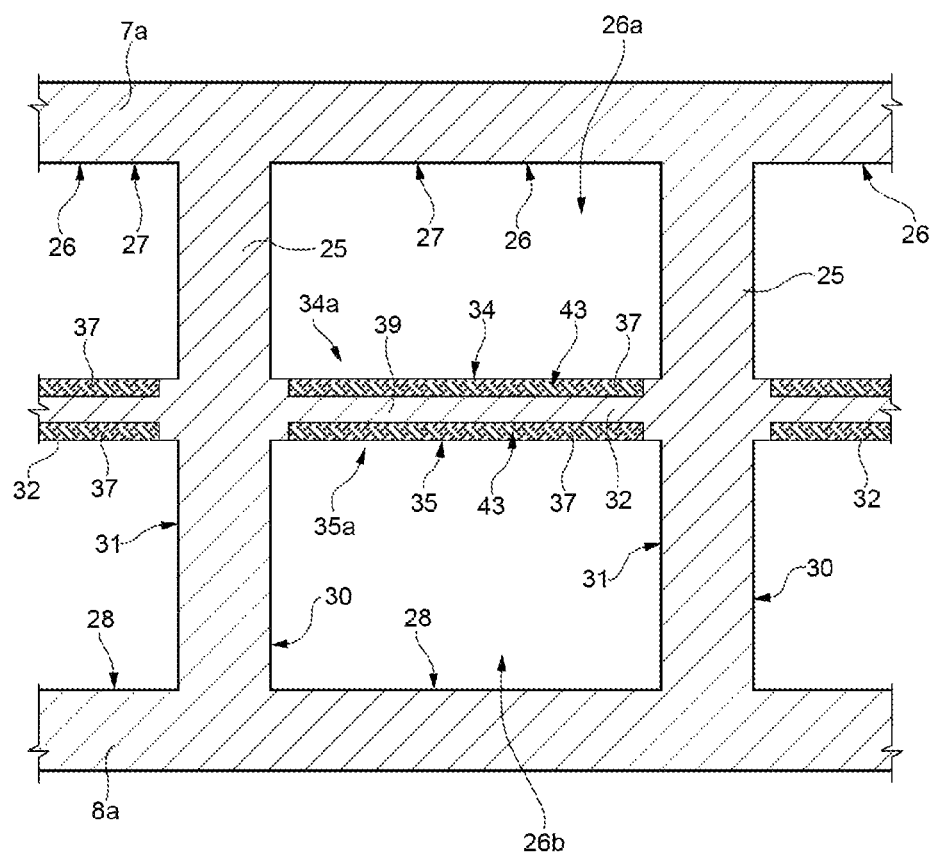
FIG. 2 is a diagrammatic cross section, on enlarged scale, taken along the section line II-II in FIG. 1.

With reference to FIG. 2, the blades 25 are spaced apart about axis 3 so as to define, between them in circumferential direction, a plurality of channels or spaces 26, defined by a surface 27 at the platform 7a and by a surface 28 at the platform 8a. In circumferential direction, each space 26 is delimited by two side surfaces 30,31, defining the pressure side and the suction side of two blades 25 which are consecutive and face each other.

According to an aspect of the present invention, each space 26 is divided in radial direction by a respective splitter 32 into a radially outer conduit 26a and into a radially inner conduit 26b. Each splitter 32 has a radially outer surface 34, facing surface 27, and a radially inner surface 35 facing surface 28.

Preferably, the surfaces 34 and 35 comprise respective zones 34a and 35a, which are defined by passive noise attenuation devices comprising soundproofing panels 37.

The panels 37 each comprise a plurality of resonators appropriately calibrated to reduce the amplitude of the acoustic emissions at given frequency ranges. The panels 37 may thus be appropriately designed according to the operating conditions and specific acoustic emissions of the turbine 1. Preferably, the panels 37 line both surfaces 34,35 of the splitter 32, which are exposed to the gas flow. An acoustic evaluation of the lining type and of the length thereof allow to make an intelligent choice, and thus considerably reduce acoustic emissions.

From the above and the accompanying figures, it may be noted that each splitter 32 comprises a body 39 made of metallic material defining a leading edge 41 and a trailing edge (FIG. 1) and having a pair of seats 43, which are made along the surfaces 34 and 35, respectively, and which house the panels 37. The thickness of the panels 37 is such to engage the seats 43 without generating steps and/or discontinuities along the surfaces 34 and 35.

Regardless of whether the panels 37 are present or not, the splitting of the rear section 15 of the annular conduit 6 into two parts may advantageously affect acoustic waves propagation reduction.

Indeed, an acoustic evaluation of the radial position of the splitters 32 allows to choose such a position intelligently and thus cause a noise reduction.

In particular, the wave front coming from the stage which precedes the array 10a is broken down into two parts at the leading edge 41: the phenomenon of acoustic scattering thus occurs.

In addition to a circumferential scattering effect due to the presence of the blades 25 in the section 15 of the annular conduit 6, the presence of the splitter induces a radial scattering which defines a redistribution of the acoustic energy. In particular, the pressure pattern along the radius of the conduit may be described by means of a set of radial waveforms, also named radial acoustic orders, each of which is associated to a respective acoustic energy fraction: because of the boundary condition variation due to the splitter, the acoustic energy fractions associated to the various radial waveforms change in the two portions of the conduit 26a and 26b.

Therefore, the acoustic waves propagate in the two conduits 26a, 26b with different energy distributions and different propagation speeds with respect to the conditions in the conduit 6 before section 15, and then recombine at the trailing edge 42, where a new redistribution of the acoustic energy occurs.

As a function of the chosen radius of the splitter 32, the acoustic energy redistributions which occur at the beginning and at the end of the splitter 32 may cause a deadening of the overall amplitude of the acoustic waves at the outlet of the splitter 32. The chosen optimal radial position for the splitter is identified by means of wave propagation numerical analysis to predict the best scattering behavior.

According to sound propagation theories in annular conduits, the acoustic pressure field within a conduit may be expressed as superimposition of different waveform components, said acoustic modes, each being defined by a corresponding circumferential order and a corresponding radial order. Firstly, a circumferential order related to the wave component the amplitude of which is intended to be reduced is selected (normally, the wave component to be processed is the highest, and this will depend on a case-by-case basis on the considered turbine according to acoustic frequencies and to flow conditions). A good reference or starting position for numerical analysis is the limit position starting from which at least one of the acoustic modes, in the selected circumferential order, is of the cut-on type in the conduit 26b. The expression "cut-on" indicates a condition in which the amplitude of an acoustic mode of circumferential order m and of radial order n is maintained unchanged during propagation.

Indeed, it has been found that the optimal radial position of the splitter (i.e. the one for which the breakdown and subsequent recombination of the acoustic waves straddling the splitter leads to a significant noise reduction) lays in the neighborhood of the reference position indicated above.

The sound propagation theories in annular conduits allow to identify a mathematical function which corresponds to the cut-on condition. With reference to a harmonic noise source of frequency $\omega$, the deriving harmonic pressure field respects the Helmholtz equation, the solution of which is:

$$p(r, x, \theta, t) = \sum_{m=-\infty}^{+\infty} \sum_{n=1}^{+\infty} A_{m,n} p_{mn} e^{i\omega t}$$

where:

$$p(r, x, \theta) = \left[ J_m(k_r^{mn} r) - \frac{J_m'(k_r^{mn} a)}{Y_m'(k_r^{mn} a)} Y_m(k_r^{mn} r) \right] e^{im\theta - ik_x^{mn} x}$$

m and n are the circumferential and radial orders of the acoustic modes;
(r, x, $\theta$) is a cylindrical reference triad with axis x which lays on the tube axis (axis 3);
$k_r$ are radial wave numbers;
$A_{m,n}$ are the amplitudes of the acoustic modes;
a and b are the radii at the outer radial end (generally named "tip") and at the inner radial end (generally named "hub") of the conduit, respectively;
$J_m$ and $Y_m$ are Bessel functions of the first and second order type m.

By setting the defined boundary conditions, in the most simple case, from a rigid wall (i.e. without acoustic lining or processing), the radial wave numbers satisfy the following equation:

$$J_m'(k_r^{mn} a) Y_m'(k_r^{mn} b) - J_m'(k_r^{mn} b) Y_m'(k_r^{mn} a) = 0$$

At the same time, the resulting radial forms are orthonormal, and the axial wave numbers $k_x$ are defined as follows:

$$k_x^{mn} = \frac{-kM \pm \sqrt{k^2 - (1 - M^2) k_r^{mn2}}}{1 - M^2}$$

where:
k is the wave number of the analyzed acoustic mode;
M is the Mach number within the conduit.

When an acoustic mode of circumferential order m and n is of the cut-on type, the axial wave number $k_x$ is a real number. In other words, the expression under square root of the last function must be either higher than or equal to zero, i.e.:

$$k^2 - (1 - M^2)(k_r^{mn})^2 \geq 0$$

Therefore:

$$k_r^{mn2} \leq k^2/(1 - M^2)$$

For a non-dispersive sound wave (i.e. of the cut-on type), the wave number k is a constant equal to the ratio between frequency $\omega$ and the speed sound propagation.

Therefore, the last inequality indicates an end or threshold value of the range within which the radial wave number must fall for the acoustic mode to be of the cut-on type.

This end value is thus inserted in the equation written further above derived by setting the boundary conditions: in such an equation, the only unknown is radius a or radius b.

Indeed, considering the conduit 26b, radius b is defined by the radius of the surface 28, so that the value of radius a, i.e. the radius of the surface 35 (which substantially corresponds to the radial position of the splitter 32) can be calculated, starting from which the cut-on condition is obtained in the conduit 26b.

Similarly, considering the conduit 26a, radius a is defined by the radius of the surface 27, so that the value of radius b can be calculated, i.e. the radius of the surface 34 (which substantially corresponds to the radial position of the splitter 32), starting from which the cut-on condition is obtained in the conduit 26a.

In practice, it is found that the value of radius a identified for conduit 26b is the most critical (because a radially outermost annular conduit has an acoustic behavior closer to the cut-on condition than a radially innermost annular conduit). Therefore, it is sufficient to determine the reference position of the splitter only considering the conduit 26b.

Therefore, the sound propagation theory in annular conduits derives from a reference position, i.e. radius a, in the neighborhood of which the splitter 32 must be arranged to obtain the optimal acoustic reduction condition. The optimal radial position is the one which guarantees a redistribution of the acoustic energy on radial orders which are higher than those in which the first wave was located was before encountering the splitter, and which are of the cut-off type, i.e. can easily attenuated in the conduit 26b.

In order to determinate the optimal radial position in the neighborhood of the found reference position, a parametric numeric simulation can be run by means of appropriate software for studying the acoustic propagation in the conduits.

In particular, a range equal to ±10% of the radius of the surface 27, i.e. of the outer radius of the conduit 26a, is defined as neighborhood of the reference position.

Such a range is split in discreet mode so as to have a set of radial positions to be analyzed. In other words, various trial positions are assigned to the splitter 32 in design and the noise deadening predicted for each of such trial positions is determined by means of the numeric simulation, by virtue of the scattering phenomenon indicated above.

By comparing the results of the various performed simulations, the radial position which guarantees the highest noise deadening is identified.

In the same manner, the optimal axial length of the splitter 32 can be determined. Indeed, such a length influences noise reduction because the scattered acoustic noise towards the higher order acoustic modes of the cut-off type decays exponentially with the length of the splitter itself.

In particular, a series of trial values are assigned to the axial length for each trial position assigned to the splitter 32 in the simulations to determine the effect thereof with regards to noise deadening and so as to contain the weight of the splitter 32 at the same time.

The simulation procedure may then proceed by subsequent approximations so as to approach optimal values for the radial position and for the axial length of the splitter 32 as much as possible.

Therefore, the adoption of the splitter 32 may significantly reduce the amplitude of the acoustic waves generated at the outlet of the turbine 1, without limiting the freedom of action in choosing the number of blades for optimizing the aerodynamic efficiency of the turbine.

In other words, by virtue of the splitter 32 the design of rotor and stator arrays of the turbine 1 can be released at least in part from considerations of acoustic nature with respect to the known design techniques based on airfoil count selection.

Although the splitters 32 potentially penalize the aerodynamic efficiency in the rear section 15 of the annular conduit 6 and cause a localized increase of weight, these drawbacks are in all cases acceptable as a whole because they allow to increase the efficiency of the turbine 1, or allow to obtain the same efficiency as the known turbines with an overall weight reduction, considering the higher degree of freedom in the design of the arrays upstream of the section 15.

Furthermore, as explained above, the surfaces 34,35 may be nearly completely lined with a material which abates the acoustic emissions of gases at the outlet of the turbine 1 before the exhaust cone. Therefore, the lining with the panels 37 allows to increase the noise deadening with respect to the known solutions.

From the above, it is apparent that changes and variations may be made to the turbine 1 without because of this departing from the scope of protection of the appended claims.

In particular, the radial position of the splitters 32 could be slightly different between each space 26 and adjacent ones.

The invention claimed is:

1. Low pressure turbine for a gas turbine engine, the turbine extending along an axis, having an annular conduit for guiding a gas flow and comprising a plurality of stator arrays of blades and a plurality of rotor arrays of blades; the last of said stator arrays, along the advancement direction of the gas flow, comprising a plurality of blades, which define a plurality of spaces between them in circumferential direction; said spaces being split by respective splitters in a radially outer conduit and in a radially inner conduit;
   characterized in that the radial position of each said splitter is in the neighborhood of a radial reference position which corresponds to a condition in which at least one acoustic mode is of a cut-on type in said radially inner conduit, for a given circumferential order of said at least one acoustic modes, wherein the radial position of each said splitter is optimized by:
   expressing the acoustic pressure field in said annular conduit in terms of acoustic modes, each defined by a circumferential order and a radial order;
   selecting one of said circumferential orders;
   calculating a radial reference position corresponding to a condition in which at least one of the acoustic modes is of the cut-on type in the radially inner conduit for the selected circumferential order; and
   positioning said splitter in the neighborhood of said radial reference position.

2. A turbine according to claim 1, characterized in that said neighborhood is defined by a range equal to ±10% of the outer radius of said radially outer conduit.

3. A turbine according to claim 1, characterized in that each said splitter is radially delimited by an outer surface and by an inner surface; said outer and inner surfaces comprising respective zones defined by soundproofing panels.

4. A method according to claim 1, characterized in that the positioning of said splitter comprises the steps of:
   assigning various trial values in the neighborhood of the radial reference position to the radial position of said splitter;
   determining the optimal radial position of the splitter by calculating the noise deadening expected for each of said trial values by means of numeric simulations, by comparing the results of said simulations and by selecting the trial value which allows to obtain the maximum noise deadening.

* * * * *